(12) United States Patent
Sagisaka et al.

(10) Patent No.: US 7,742,516 B2
(45) Date of Patent: Jun. 22, 2010

(54) MODULATOR

(75) Inventors: Masahiko Sagisaka, Ota-ku (JP); Yusaku Tada, Yokohama (JP)

(73) Assignee: Panasonic Corporation, Osaka (JP)

( * ) Notice: Subject to any disclaimer, the term of this patent is extended or adjusted under 35 U.S.C. 154(b) by 1090 days.

(21) Appl. No.: 11/171,405

(22) Filed: Jul. 1, 2005

(65) Prior Publication Data

US 2006/0002286 A1 Jan. 5, 2006

(30) Foreign Application Priority Data

Jul. 5, 2004 (JP) ............................. 2004-198072

(51) Int. Cl.
*H04B 1/00* (2006.01)
(52) U.S. Cl. .................. 375/130; 375/131; 375/146; 375/295; 375/296; 370/203
(58) Field of Classification Search ......... 375/130–131, 375/140, 114, 146, 148, 295–297, 135, 249, 375/283; 370/320, 335, 342, 441, 203
See application file for complete search history.

(56) References Cited

U.S. PATENT DOCUMENTS

| | | | | |
|---|---|---|---|---|
| 5,414,728 | A * | 5/1995 | Zehavi | 375/142 |
| 6,353,604 | B2 * | 3/2002 | Grimwood et al. | 370/335 |
| 6,549,564 | B1 | 4/2003 | Popovic | |
| 6,639,937 | B2 * | 10/2003 | Doetsch et al. | 375/130 |
| 6,650,688 | B1 * | 11/2003 | Acharya et al. | 375/141 |
| 6,701,163 | B1 * | 3/2004 | Hiramatsu | 455/561 |
| 6,717,464 | B2 * | 4/2004 | Fudaba et al. | 330/149 |
| 6,819,708 | B1 * | 11/2004 | Lim et al. | 375/146 |
| 6,833,770 | B1 * | 12/2004 | Fukumoto et al. | 332/103 |
| 7,170,922 | B2 * | 1/2007 | Shiina et al. | 375/130 |
| 7,254,117 | B2 * | 8/2007 | Choi et al. | 370/335 |

(Continued)

FOREIGN PATENT DOCUMENTS

EP 0751630 1/1997

(Continued)

OTHER PUBLICATIONS

European Search Report dated Mar. 9, 2007 with Written Opinion.

(Continued)

*Primary Examiner*—Mohammad H Ghayour
*Assistant Examiner*—Sophia Vlahos
(74) *Attorney, Agent, or Firm*—Dickinson Wright PLLC

(57) ABSTRACT

A modulator, and more particularly an HPSK modulator, is disclosed that enables the circuit scale to be reduced and also enables power consumption to be reduced. An HPSK modulator 209 incorporated in a radio communication apparatus or the like is equipped with a spreading code multiplication section 11, a complex arithmetic section 101, a coefficient determination section 51, and raised COS filters 41 and 42. Spreading code multiplication section 11 multiplies transmit data DPDCH1 by a spreading code Cd1. Complex arithmetic section 101 performs complex arithmetic on an output signal output from spreading code multiplication section 11 and a scrambling code Sn, and performs conversion to complex data. Coefficient determination section 51 determines a filter coefficient Ad1$n$ based on a gain factor $\beta$d1 that determines transmission power. Raised COS filters 41 and 42 band-limit the complex data using the filter coefficient.

3 Claims, 12 Drawing Sheets

U.S. PATENT DOCUMENTS

| | | |
|---|---|---|
| 2001/0055320 A1 | 12/2001 | Pierzga |
| 2002/0021744 A1 | 2/2002 | Iida |
| 2004/0170283 A1 | 9/2004 | Terada |

FOREIGN PATENT DOCUMENTS

| | | |
|---|---|---|
| GB | 2296165 | 6/1996 |
| JP | 2001339365 | 12/2001 |
| JP | 2002033716 | 1/2002 |
| JP | 2002542650 | 12/2002 |
| JP | 2003110465 | 4/2003 |
| JP | 2003-274480 | 9/2003 |

OTHER PUBLICATIONS

Japanese Office Action dated Apr. 21, 2009.

* cited by examiner

MODULATOR

BACKGROUND OF THE INVENTION

1. Field of the Invention

The present invention relates to a modulator, and more particularly to a digital modulator used in radio communications and so forth. Furthermore, the present invention relates to a technology that is effective for application to a Hybrid Phase Shift Keying (HPSK) modulator used with the W-CDMA (Wideband—Code Division Multiple Access) method.

2. Description of the Related Art

In a communication system that uses the W-CDMA method, in reception a control channel is inserted into a transmit channel by time division. In transmission, on the other hand, the HPSK modulation method is used. With this HPSK modulation method, orthogonal components of spread data of multiple channels are converted to vector values, and these are further rotated using a scrambling code. When the HPSK modulation method is used for normal transmission (single mode), two channels—a transmit channel and a control channel—are provided, and multimode operation is established if transmit channels are further superimposed in this state.

Concrete examples of multimode operation include a case where image data is sent at the same time as voice data, and a case where mail data is sent at the same time as voice data. As the amount of data transmitted differs for voice data and image data, voice data is transmitted at low speed and mail data at high speed. The transmission data rates are in the range from 15 kbps to 960 kbps, and are variable. The chip rate (spreading code rate) is 3.84 MHz, and one data is spread using a ratio of 4 chips to 256 chips.

In a communication system using this kind of HPSK modulation method, reception becomes difficult on the receiving side at high speeds, and therefore transmission power is varied according to the transmission data rate of the transmitting side. That is to say, control is performed so that the speed of the transmission data rate and the magnitude of the transmission power are made proportional, and transmission power is increased as the transmission data rate becomes faster, enabling reception to be performed easily during high-speed communication. This function was previously relegated to the high-frequency region (RF region), but when the W-CDMA method is used this function tends to be used in the baseband region in order to handle multimode operation.

Transmission gain that makes transmission power variable is called $\beta$. In the baseband section, since a voltage is output, the transmission gain $\beta$ value is made proportional to the transmission data rate, and is set in the range 0 to 15 (4 bits).

A single-mode HPSK modulator is disclosed in Unexamined Japanese Patent Publication No. 2001-339365. as shown in FIG. 12, this HPSK modulator is equipped with multipliers 11 and 17, a complex arithmetic section 101 composed of multipliers 21, 27, and 37, raised COS filters 41 through 44, envelope generators 91 and 92, multipliers 81 through 84, and adders 71 and 72.

Multiplier 11 multiplies transmit data 1 of dedicated physical data channel DPDCH1 by a spreading code. Multiplier 17 multiplies control data 7 of dedicated physical control channel DPCCH by a spreading code. Complex arithmetic section 101 performs complex arithmetic between the outputs of multipliers 11 and 17 and a scrambling code, and generates real part data and imaginary part data for each channel. Raised COS filters 41 through 44 band-limit the output data of each channel from complex arithmetic section 101. Multipliers 81 through 84 multiply the output data of raised COS filters 41 through 44 by a gain factor. Adder 71 adds together the real part data output from multipliers 81 and 82, and adder 72 adds together the imaginary part data output from multipliers 82 and 84.

To be more specific, multipliers 11 and 17 each comprise an exclusive-OR circuit. Multipliers 21, 27, and 37 each comprise an exclusive-OR circuit or two exclusive-NOR circuits. Raised COS filters 41 through 44 each comprise a 1-bit-input FIR filter (Finite Impulse Response Filter).

Multiplier 11 multiplies transmit data 1 input via dedicated physical data channel DPDCH1 by a transmit data spreading code Cd1, and outputs output data I ($=Cd1 \times DPDCH1$) to multiplier 21. Here, transmit data 1 is 1-bit data with a data rate of 15 kbps to 960 kbps, for example, and transmit data spreading code Cd1 is 1-bit data with a chip rate of 3.84 MHz, for example. Therefore, multiplier 11 output data I is 1-bit data that varies on a chip-by-chip basis.

Multiplier 17 multiplies control data 7 input via dedicated physical control channel DPCCH by a control data spreading code Cc, and outputs output data Q ($=Cc \times DPCCH$) to multiplier 37. Here, control data 7 is 1-bit data with a data rate of 15 kbps, for example, and control data spreading code Cc is 1-bit data with a chip rate of 3.84 MHz, for example. Therefore, multiplier 17 output data Q is 1-bit data that varies on a chip-by-chip basis.

Multiplier 21 performs complex arithmetic in which output data I from multiplier 11 is multiplied by a scrambling code Sn, and outputs 1-bit complex data comprising real part data Ii1 ($=SIn \times I$) and imaginary part data Iq1 ($=SQn \times Q$). Here, scrambling code Sn comprises complex data with a chip rate of 3.84 MHz, each of 1 bit, for example. SIn is scrambling code Sn real number data, and SQn is scrambling code Sn imaginary number data.

Multiplier 27 has, as input, output data jQ from multiplier 37 in which output data Q from multiplier 17 has been multiplied by an imaginary number j. Multiplier 27 performs complex arithmetic in which output data jQ is multiplied by a scrambling code Sn, and outputs 1-bit complex number data comprising real part data Qi1 ($=SIn \times Q$) and imaginary part data Qq1 ($=-SQn \times I$).

Raised COS filter 41 outputs multi-bit data Ii2 in which multiplier 21 output data Ii1 has been band-limited. Raised COS filter 42 outputs multi-bit data Iq2 in which multiplier 21 output data Iq1 has been band-limited. Raised COS filter 43 outputs multi-bit data Qi2 in which multiplier 27 output data Qi1 has been band-limited. Raised COS filter 44 outputs multi-bit data Qq2 in which multiplier 27 output data Qq1 has been band-limited. Here, 10-bit impulse response FIR filters are used for raised COS filters 41 through 44, and each of output data Ii2, Iq2, Qi2, and Qq2 is 10-bit data.

Envelope generator 91 outputs gain factor $\beta d1'$ for which smooth envelope control is performed when gain factor $\beta d1$ is changed. Envelope generator 92 outputs gain factor $\beta c'$ for which smooth envelope control is performed when gain factor $\beta c$ is changed. Here, $\beta d1 = \beta d1'$ and $\beta c = \beta c'$.

Multiplier 81 performs multiplication of output data Ii2 from raised COS filter 41 and gain factor $\beta d1$, generates multi-bit data Ii3, and outputs this to adder 71. Multiplier 82 performs multiplication of output data Iq2 from raised COS filter 42 and gain factor d1, generates multi-bit data Iq3, and outputs this to adder 72.

Multiplier 83 performs multiplication of output data Qi2 from raised COS filter 43 and gain factor $\beta c$, generates multi-bit data Qi3, and outputs this to adder 71. Multiplier 84 performs multiplication of output data Qq2 from raised COS filter 44 and gain factor βc, generates multi-bit data Qq3, and outputs this to adder 72.

Adder 71 generates output data Iout (=Ii3+Qi3) comprising multi-bit data in which output data Ii3 from data channel multiplier 81 and output data Qi3 from control channel multiplier 83 have been added, and outputs this output data Iout. Adder 72 generates output data Qout (=Iq3+Qq3) comprising multi-bit data in which output data Iq3 from data channel multiplier 82 and output data Qq3 from control channel multiplier 84 have been added, and outputs this output data Qout. Output data Iout output from adder 71 and output data Qout output from adder 72 undergo digital-analog conversion in next-stage D/A converters, and are sent to the high-frequency area.

However, in the above-described HPSK modulator, consideration has not been given to the fact that, since outputs from raised COS filters 41 through 44 and gain factors βd1 and βc are multiplied, multi-bit multipliers operating at a rate of n times 3.84 MHz are necessary, increasing circuit scale and power consumption.

SUMMARY OF THE INVENTION

It is an object of the present invention to provide a modulator, and more particularly an HPSK modulator, that enables circuit scale and power consumption to be reduced.

According to an aspect of the invention, a modulator is equipped with a spreading code multiplication section that multiplies transmit data by a spreading code; a complex arithmetic section that performs complex arithmetic on an output signal output from the spreading code multiplication section and a scrambling code, and converts the output signal to complex data; a coefficient determination section that determines a filter coefficient based on a gain factor that determines transmission power; and a filter that band-limits the complex data using the filter coefficient.

According to another aspect of the invention, a modulator is equipped with a spreading code multiplication section that multiplies transmit data by a spreading code; a filter that band-limits an output signal output from the spreading code multiplication section; and a coefficient determination section that determines a filter coefficient of the filter based on a gain factor that determines transmission power and a scrambling code.

According to another aspect of the invention, a modulator is equipped with a complex arithmetic section that performs complex arithmetic on transmit data and a scrambling code, and converts the transmit data to complex data; a filter that band-limits complex data output from the complex arithmetic section; and a coefficient determination section that determines a filter coefficient of the filter based on a gain factor that determines transmission power and a spreading code.

According to another aspect of the invention, a modulator is equipped with a filter that band-limits transmit data; a complex arithmetic section that performs complex arithmetic on a spreading code and a scrambling code; and a coefficient determination section that determines a filter coefficient of the filter based on complex data output from the complex arithmetic section and a gain factor that determines transmission power.

According to another aspect of the invention, a hybrid phase shift keying modulator is equipped with a spreading code multiplication section that has control channel control data and transmit channel transmit data as input, multiplies the control data and transmit data by a spreading code, and outputs the resulting data; a complex arithmetic section that performs complex arithmetic on each output from the spreading code multiplication section and a scrambling code, and performs expansion into real part data and imaginary part data for each control channel and each transmit channel; a coefficient determination section that outputs a filter coefficient based on a gain factor; a raised COS filter that band-limits output signals output from the complex arithmetic section for each control channel and for each transmit channel using the filter coefficient; and an adding section that adds real part data of each control channel and of each transmit channel that passes through the raised COS filter, and also adds respective imaginary part data thereof.

According to another aspect of the invention, a hybrid phase shift keying modulator is equipped with a spreading code multiplication section that has control channel control data and transmit channel transmit data as input, multiplies the control data and transmit data by a spreading code, and outputs the resulting data; a raised COS filter that band-limits an output signal output from the spreading code multiplication section; a coefficient determination section that determines a filter coefficient of the raised COS filter based on a gain factor that determines transmission power and a scrambling code; and an adding section that adds real part data of each control channel and of each transmit channel that passes through the raised COS filter, and also adds respective imaginary part data thereof.

According to another aspect of the invention, a hybrid phase shift keying modulator is equipped with a complex arithmetic section that has control channel control data and transmit channel transmit data as input, performs complex arithmetic on the control data and the transmit data and a scrambling code, and performs expansion into real part data and imaginary part data for each control channel and each transmit channel; a raised COS filter that band-limits complex data output from the complex arithmetic section; a spreading multiplication section that multiplies the control data and transmit data by a gain factor; a coefficient determination section that determines a filter coefficient of the raised COS filter based on a spreading code and the gain factor; and an adding section that adds real part data of each control channel and of each transmit channel that passes through the raised COS filter, and also adds respective imaginary part data thereof.

According to still another aspect of the invention, a hybrid phase shift keying modulator is equipped with a raised COS filter that has control channel control data and transmit channel transmit data as input, and band-limits the control data and transmit data; a complex arithmetic section that performs complex arithmetic based on a spreading code and scrambling code; a coefficient determination section that determines a filter coefficient of the raised COS filter based on complex data output from the complex arithmetic section and a gain factor; and an adding section that adds real part data of each control channel and of each transmit channel that passes through the raised COS filter, and also adds respective imaginary part data thereof.

BRIEF DESCRIPTION OF THE DRAWINGS

The above and other objects and features of the invention will appear more fully hereinafter from a consideration of the following description taken in conjunction with the accompanying drawing wherein one example is illustrated by way of example, in which.

DESCRIPTION OF THE PREFERRED EMBODIMENTS

An essential point of the present invention is that, by selecting a filter coefficient according to a gain factor, and performing transmit data and control data band-limiting with a filter using this filter coefficient, multipliers that multiply a gain factor by band-limited complex data are reduced in number. Also, an essential point of the present invention is that, by performing band-limiting of control data and transmit data with a raised COS filter using a filter coefficient in accordance with a gain factor, multipliers that multiply a gain factor by band-limited complex data are reduced in number.

With reference now to the accompanying drawings, embodiments of the present invention will be explained in detail below.

Embodiment 1

Configuration of Mobile Phone

Figure 2:
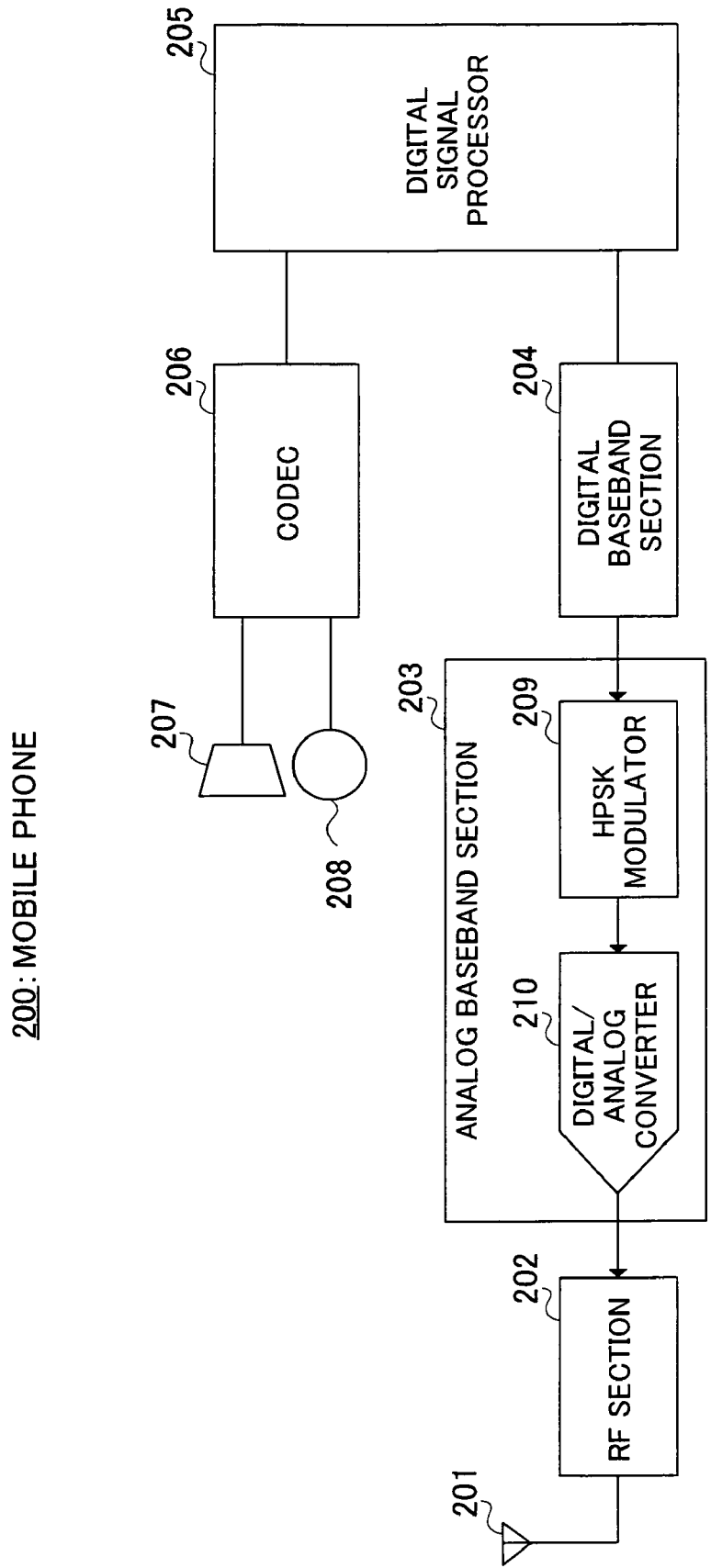
FIG. 2 is a block diagram of a mobile phone according to Embodiment 1 of the present invention.

An HPSK modulator according to Embodiment 1 of the present invention is incorporated in a mobile phone, for example. As shown in FIG. 2, a mobile phone 200 is equipped with an antenna 201, an RF section 202, an analog baseband section 203, a digital baseband section 204, a digital signal processor (DSP) 205, a codec 206, a speaker 207, and a microphone 208. Analog baseband section 203 has an HPSK modulator 209 and a digital/analog converter 210.

In mobile phone 200, a voice signal input from microphone 208 is converted to an analog signal by codec 206. This analog signal undergoes digital processing by digital signal processor 205, and a digital signal is generated by this digital signal processor 205. This digital signal undergoes baseband signal processing by digital baseband section 204, followed by digital modulation by HPSK modulator 209 and conversion to an analog signal by digital/analog converter 210 in analog baseband section 203. This analog signal is converted to a radio band signal by RF section 202, and is transmitted as a radio wave via antenna 201.

[Configuration of HPSK Modulator]

Figure 1:
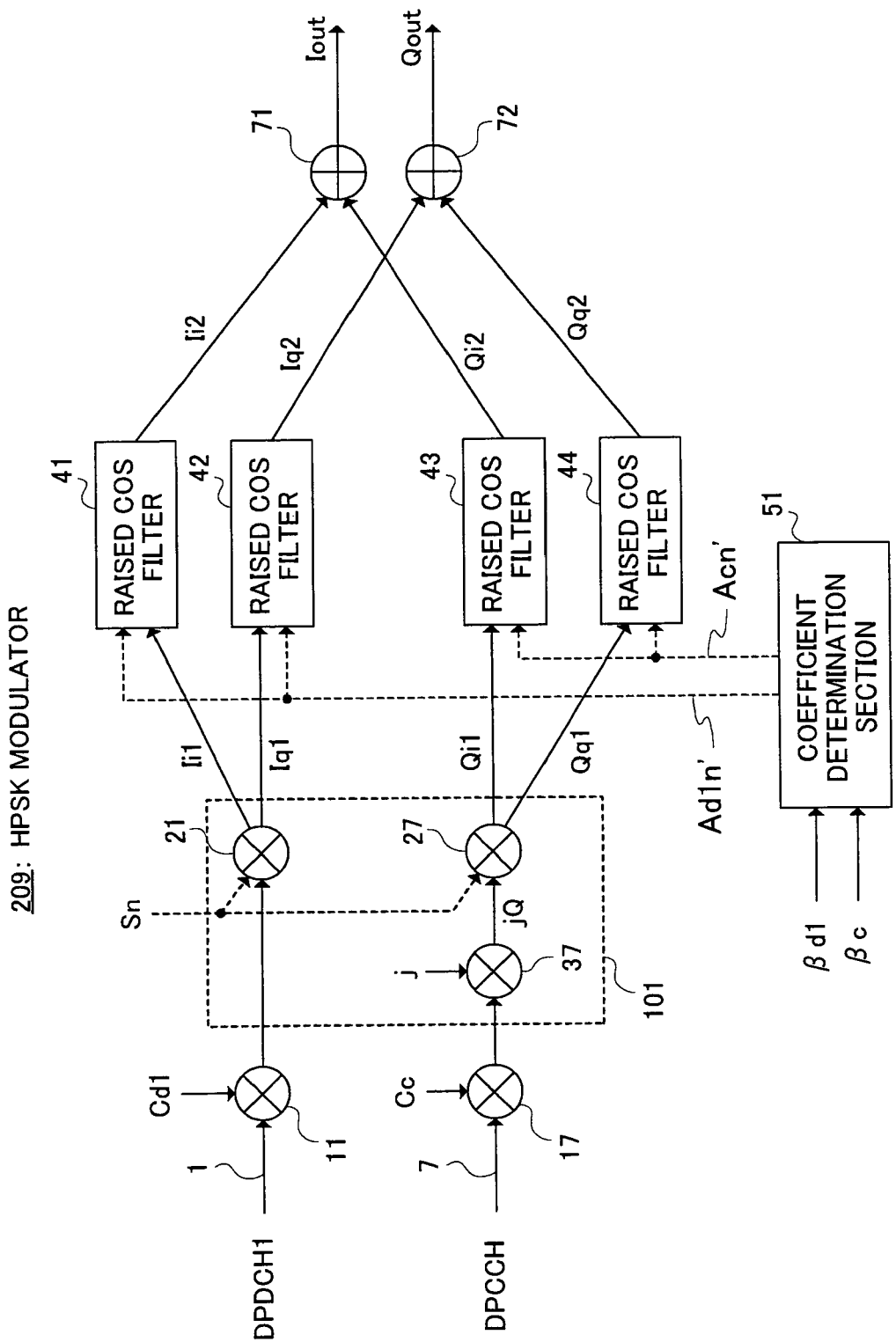
FIG. 1 is a block diagram showing the configuration of an HPSK modulator according to Embodiment 1 of the present invention.

In Embodiment 1, HPSK modulator 209 is a single-mode modulator. As shown in FIG. 1, HPSK modulator 209 is equipped with at least multipliers 11 and 17, a complex arithmetic section 101 containing multipliers 21, 27, and 37, a coefficient determination section 51, raised COS filters 41 through 44, and adders 71 and 72.

Multipliers 11 and 17 each comprise an exclusive-OR circuit. Multipliers 21, 27, and 37 each comprise an exclusive-OR circuit or two exclusive-NOR circuits. Coefficient determination section 51 comprises memory that can only be read, such as ROM (Read Only Memory), for example. Coefficient determination section 51 may also comprise a multiplier. Raised COS filters 41 through 44 each comprise a 1-bit-input FIR filter.

The component parts of HPSK modulator 209 will now be described in greater detail. Multiplier 11 multiplies transmit data 1 input via dedicated physical data channel DPDCH1 by a transmit data spreading code Cd1, and outputs output data I (=Cd1×DPDCH1) to multiplier 21. Here, transmit data 1 is 1-bit data with a data rate of 15 kbps to 960 kbps, for example, and transmit data spreading code Cd1 is 1-bit data with a chip rate of 3.84 MHz, for example. Therefore, multiplier 11 output data I is 1-bit data that varies on a chip-by-chip basis.

Multiplier 17 multiplies control data 7 input via dedicated physical control channel DPCCH by a control data-spreading code Cc, and outputs output data Q (=Cc×DPCCH) to multiplier 37. Here, control data 7 is 1-bit data with a data rate of 15 kbps, for example, and control data spreading code Cc is 1-bit data with a chip rate of 3.84 MHz, for example. Therefore, multiplier 17 output data Q is 1-bit data that varies on a chip-by-chip basis.

Multiplier 21 performs complex arithmetic in which output data I output from multiplier 11 is multiplied by a scrambling code Sn, and outputs 1-bit complex data comprising real part data Ii1 (=SIn×I) and imaginary part data Iq1 (=SQn×Q). Here, scrambling code Sn comprises complex data with a chip rate of 3.84 MHz, each of 1 bit, for example. SIn is scrambling code Sn real number data, and SQn is scrambling code Sn imaginary number data.

Multiplier 37 outputs to multiplier 27 output data jQ in which output data Q output from multiplier 17 has been multiplied by an imaginary number j. Multiplier 27 performs complex arithmetic in which output data jQ is multiplied by a scrambling code Sn, and outputs 1-bit complex number data comprising real part data Qi1 (=SIn×Q) and imaginary part data Qq1 (=−SQn×I).

Coefficient determination section 51 outputs coefficients of raised COS filters 41 through 44. For an original raised COS filter coefficient An, coefficient determination section 51 outputs filter coefficients in accordance with gain factor βd1 and gain factor βc. To be specific, coefficient determination section 51 outputs filter coefficient Ad1n' (=Ad1n×βd1) to raised COS filters 41 and 42, and outputs filter coefficient Acn' (=Acn×βc) to raised COS filters 43 and 44.

Values of filter coefficients Ad1n' and Acn' are stored beforehand in the ROM of coefficient determination section 51, and these stored filter coefficient Ad1n' and Acn' values can be output by using gain factors βd1 and βc as ROM addresses. In Embodiment 1, 10-bit impulse response FIR filters are used for raised COS filters 41 through 44, and therefore Ad1n' and Acn' are 10-bit data. Instead of ROM, coefficient determination section 51 may comprise a multiplier that computes and outputs filter coefficient Ad1n' (=Ad1n×βd1) and filter coefficient Acn' (=Acn×βc).

Raised COS filter 41 outputs multi-bit data Ii2 in which multiplier 21 output data Ii1 has been band-limited using Ad1n' output from coefficient determination section 51 as a filter coefficient. Raised COS filter 42 outputs multi-bit data Iq2 in which multiplier 21 output data Iq1 has been band-limited using Ad1n' output from coefficient determination section 51 as a filter coefficient.

Raised COS filter 43 outputs multi-bit data Qi2 in which multiplier 27 output data Qi1 has been band-limited using Acn' output from coefficient determination section 51 as a filter coefficient. Raised COS filter 44 outputs multi-bit data Qq2 in which multiplier 27 output data Qq1 has been band-limited using Acn' output from coefficient determination section 51 as a filter coefficient.

Adder 71 generates output data Iout (=Ii2+Qi2) comprising multi-bit data in which output data Ii2 from data channel raised COS filter 41 and output data Qi2 from control channel raised COS filter 43 have been added, and outputs this output data Iout. Adder 72 generates output data Qout (=Iq2+Qq2) comprising multi-bit data in which output data Iq2 from data channel raised COS filter 42 and output data Qq2 from control channel raised COS filter 44 have been added, and outputs this output data Qout.

Output data Iout from adder 71 and output data Qout from adder 72 undergo digital-analog conversion in next-stage digital/analog converter 210 shown in FIG. 2, and are sent to RF section 202.

[Configuration of raised COS filters]

Figure 3:
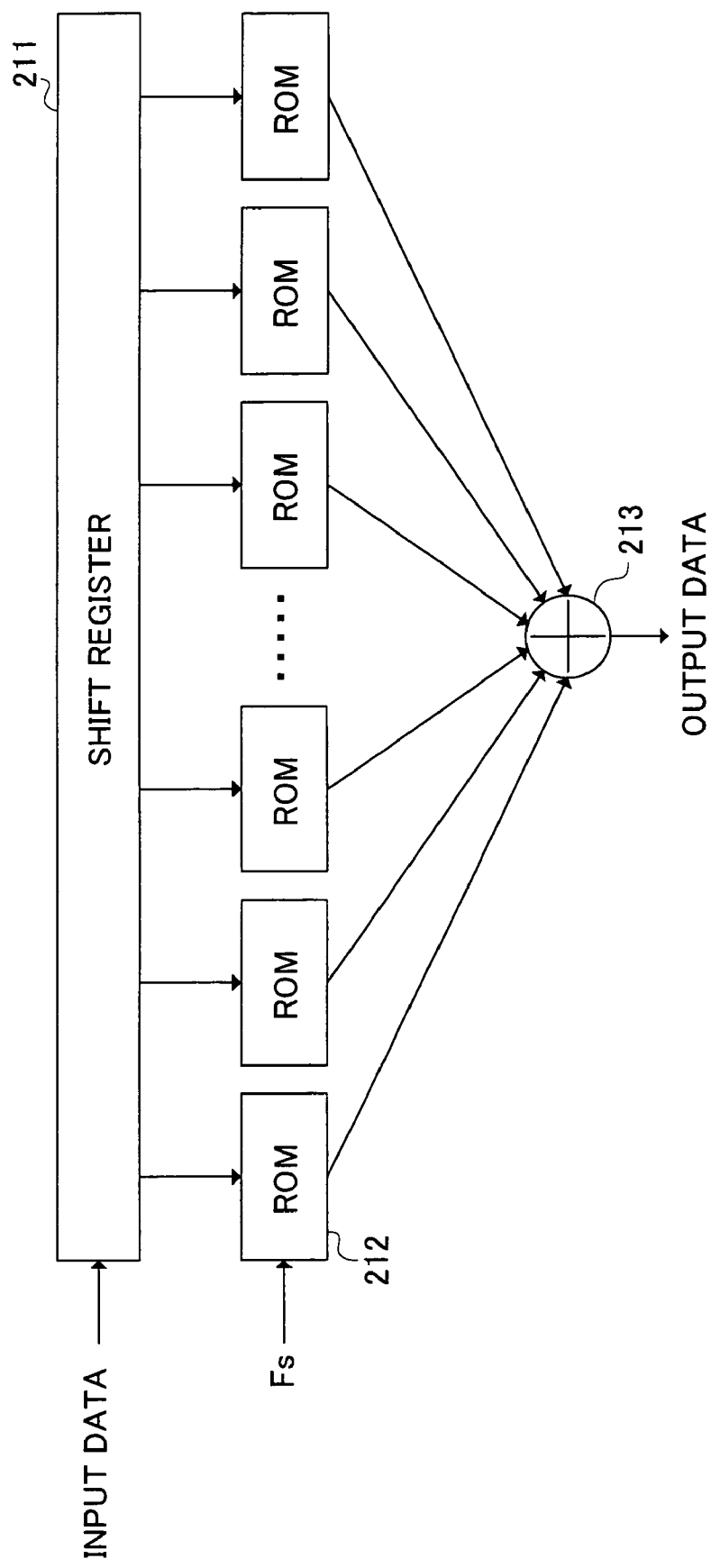
FIG. 3 is a block diagram showing a first configuration of a raised COS filter of the HPSK modulator shown in FIG. 1.
Figure 4:
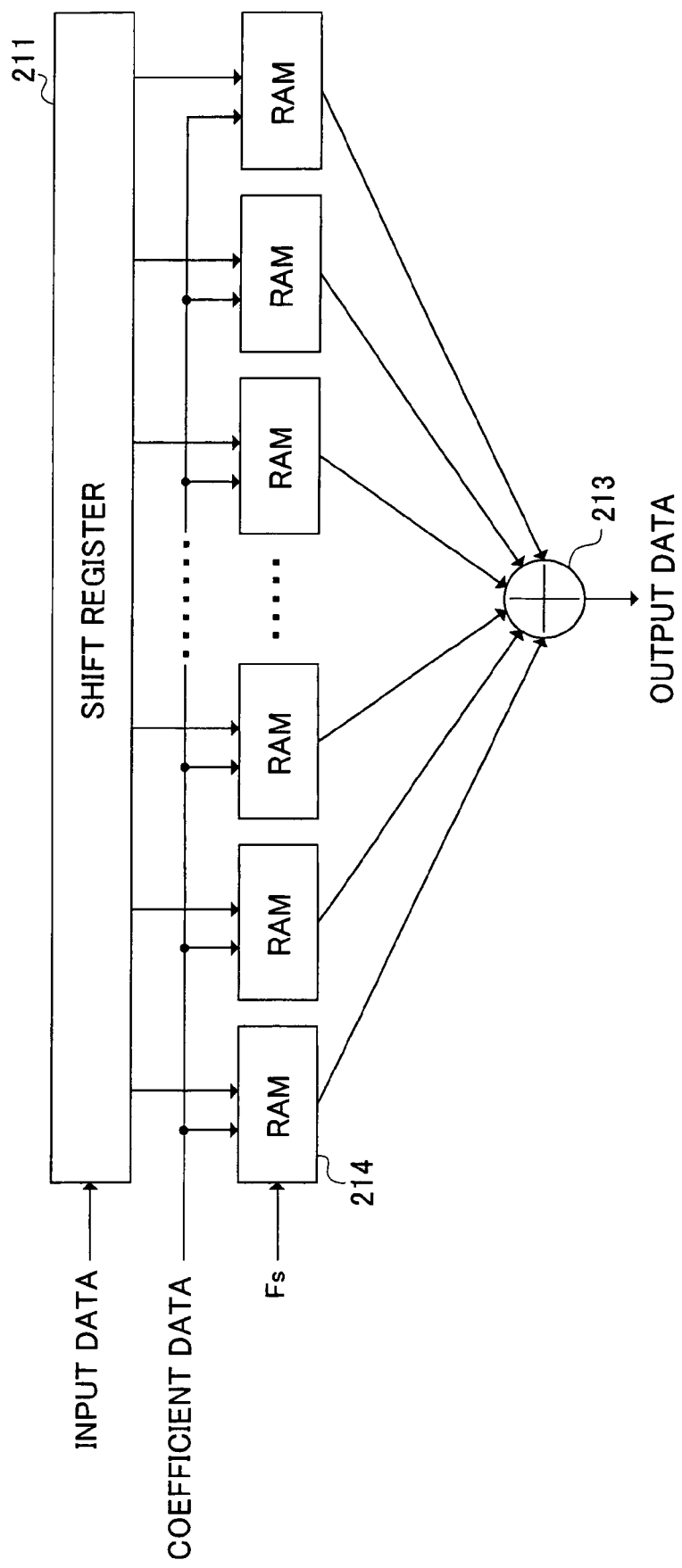
FIG. 4 is a block diagram showing a second configuration of a raised COS filter of the HPSK modulator shown in FIG. 1.

Next, the actual configuration of raised COS filters 41 through 44 will be described using FIG. 3 and FIG. 4.

When filter coefficients are used in a fixed mode, raised COS filters 41 through 44 are equipped with an n-bit shift register 211 (where n is a natural number), n ROMs 212, and an adder 213. Filter coefficients of raised COS filters 41 through 44 are stored in n ROMs 212.

When filter coefficients are used in a variable mode, raised COS filters 41 through 44 are equipped with an n-bit shift register 211, n RAMs 214, and an adder 213. Filter coefficients of the raised COS filters are stored in n RAMs 214. When it becomes necessary to change the filter coefficients—that is, when the values of gain factors βd1 and βc vary—use as variable filter coefficient raised COS filters 41 through 44 is possible by accepting new filter coefficient data from coefficient determination section 51 shown in FIG. 1 and rewriting the filter coefficient data. In Embodiment 1, it is necessary for the filter coefficients of raised COS filters 41 through 44 to be variable, and therefore the variable filter coefficient method shown in FIG. 4 is used.

[Operation of HPSK Modulator]

Next, the operation of HPSK modulator 209 according to Embodiment 1 will be described.

In HPSK modulator 209, when transmit data 1 is input to multiplier 11, transmit data 1 is multiplied by transmit data spreading code Cd1, and output data I (=Cd1×DPDCH1) is output from multiplier 11. This output data I is 1-bit data that varies on a chip-by-chip basis. When control data 7 is input to multiplier 17, control data 7 is multiplied by control data spreading code Cc, and output data Q (=Cc×DPCCH) is output from multiplier 17. This output data Q is 1-bit data that varies on a chip-by-chip basis.

When output data I is input to multiplier 21, complex arithmetic is performed in which output data I is multiplied by a scrambling code Sn comprising complex data. As a result of this complex arithmetic, 1-bit real part data Ii1 (=SIn×I) and 1-bit imaginary part data Iq1 (=SQn×Q) are output from multiplier 21 to raised COS filters 41 and 42 respectively. Here, SIn is scrambling code Sn real number data, and SQn is scrambling code Sn imaginary number data.

When output data Q is input to multiplier 37, it is multiplied by imaginary number j in multiplier 37, and output data jQ is output from multiplier 37. When output data Q is input to multiplier 27, complex arithmetic is performed in which output data jQ is multiplied by a scrambling code Sn comprising complex data in multiplier 27. As a result of this complex arithmetic, 1-bit real part data Qi1 (=SIn×Q) and imaginary part data Iq1 (=Qq1×I) are output from multiplier 27 to raised COS filters 43 and 44 respectively.

When gain factors βd1 and βc are input to coefficient determination section 51, coefficient determination section 51 outputs filter coefficient Ad1n' resulting from multiplying original filter coefficient An by a factor of gain factor βd1, and also outputs filter coefficient Acn' resulting from multiplying original filter coefficient An by a factor of gain factor βc. Filter coefficient Ad1n' is used as the filter coefficient of raised COS filters 41 and 42, and filter coefficient Acn' is used as the filter coefficient of raised COS filters 43 and 44.

When output data Ii1 output from multiplier 21 is input to raised COS filter 41, raised COS filter 41 performs band-limiting using filter coefficient Ad1n' output from coefficient determination section 51, and band-limited multi-bit data Ii2 is output to adder 71. When output data Iq1 output from multiplier 21 is input to raised COS filter 42, raised COS filter 42 performs band-limiting using filter coefficient Ad1n' output from coefficient determination section 51, and band-limited multi-bit data Iq2 is output to adder 72.

When output data Qi1 output from multiplier 27 is input to raised COS filter 43, raised COS filter 43 performs band-limiting using filter coefficient Acn' output from coefficient determination section 51, and band-limited multi-bit data Qi2 is output to adder 71. When output data Qi1 output from multiplier 27 is input to raised COS filter 44, raised COS filter 44 performs band-limiting using filter coefficient Acn' output from coefficient determination section 51, and band-limited multi-bit data Qq2 is output to adder 72.

When data channel raised COS filter 41 output Ii2 and control channel raised COS filter 43 output Qi2 are input to adder 71, adder 71 adds these outputs and generates multi-bit output data Iout (=Ii3+Qi3), and outputs this output data Iout to next-stage circuitry. Therefore, adder 71 can output data resulting from adding together the real part data of each channel.

When data channel raised COS filter 42 output Iq2 and control channel raised COS filter 44 output Qq2 are input to adder 72, adder 72 adds these outputs and generates multi-bit output data Qout (=Iq3+Qq3), and outputs this output data Qout to next-stage circuitry. Therefore, adder 72 can output data resulting from adding together the imaginary part data of each channel.

As described above, according to Embodiment 1, for each transmit data 1 and control data 7 of two communication channels, multiplication by spreading codes Cd1 and Cc is performed, followed by complex arithmetic using scrambling code Sn and conversion to complex data, and when the real part data and imaginary part data of this converted complex data are band-limited, filter coefficients Ad1n' and Acn' that take gain factors βd1 and βc into consideration are used, thus enabling multipliers that multiply gain factors βd1 and βc by band-limited complex data to be reduced in number. Therefore, in HPSK modulator 209, the circuit scale can be reduced, and power consumption can also be reduced in line with this reduction in circuit scale.

Embodiment 2

Embodiment 2 of the present invention is a single-mode embodiment, as with HPSK modulator 209 according to Embodiment 1, and will be described as an example in which the configuration of HPSK modulator 209 according to Embodiment 1 is simplified.

Figure 5:
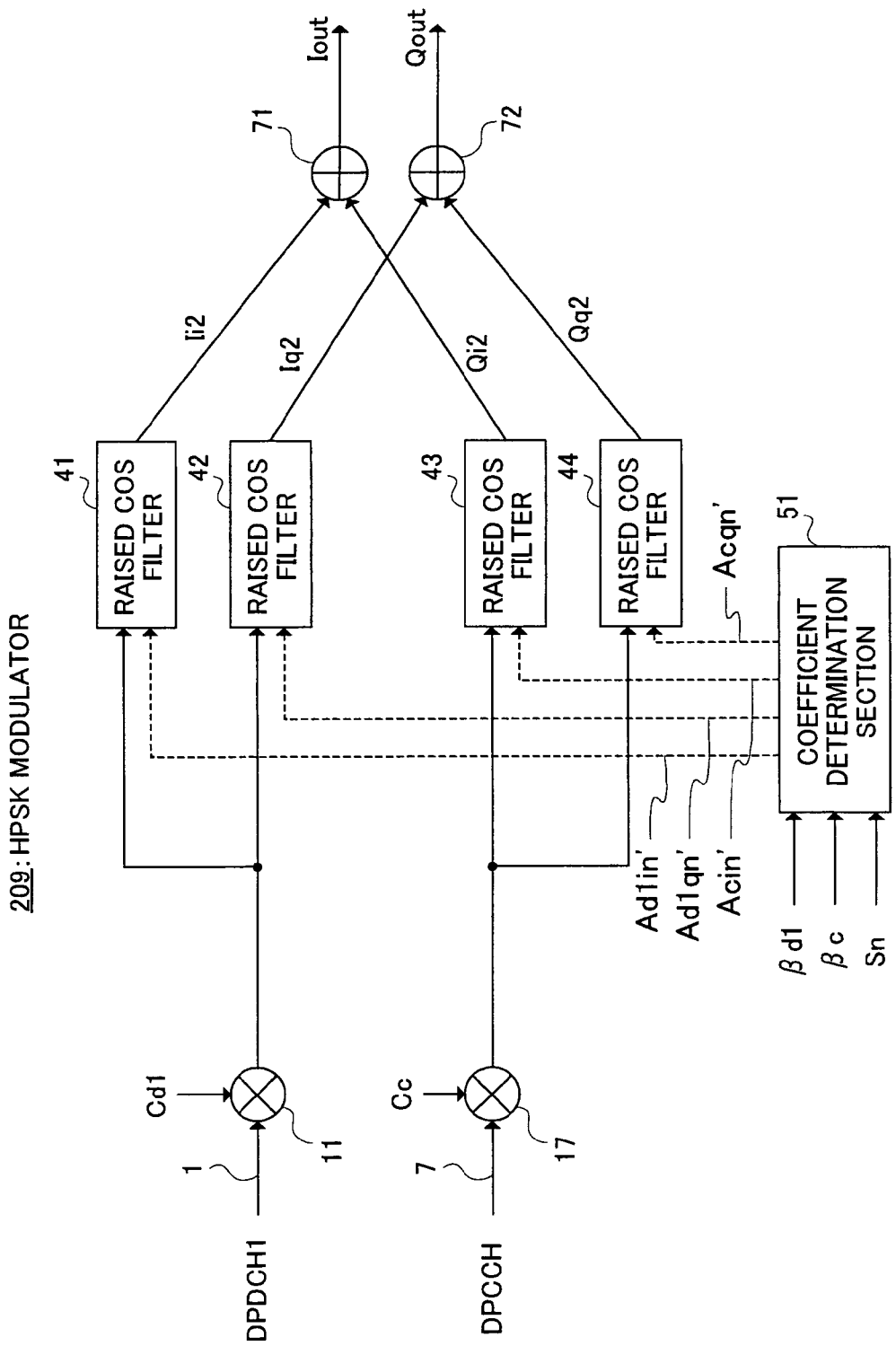
FIG. 5 is a block diagram showing the configuration of an HPSK modulator according to Embodiment 2 of the present invention.

As shown in FIG. 5, HPSK modulator 209 according to Embodiment 2 is equipped with a coefficient determination section 51 that has a scrambling code Sn multiplication function instead of complex arithmetic section 101 that performs complex arithmetic on scrambling code Sn. That is to say, there is no complex arithmetic section 101 in HPSK modulator 209 according to Embodiment 2.

As scrambling code Sn decides the positive/negative sign of data, HPSK modulator 209 according to Embodiment 2 can obtain the same kind of output as HPSK modulator 209 according to Embodiment 1 by varying the positive/negative sign of filter coefficients Ad1in' and Ad1qn', and Acin' and Acqn', of raised COS filters 41 through 44, according to scrambling code Sn.

Coefficient determination section 51 comprises ROM in the same way as coefficient determination section 51 according to Embodiment 1. Filter coefficients Ad1in' and Ad1qn', and Acin' and Acqn', output from coefficient determination section 51 comprise those resulting from multiplying original filter coefficient An by gain factor βd1 or gain factor c, and those resulting from performing complex arithmetic on scrambling code Sn. Therefore, by preparing these computational values in advance and storing them in ROM, it is possible to output filter coefficients Ad1in' and Ad1qn', and Acin' and Acqn', corresponding to gain factor βd1, gain factor βc, and scrambling code Sn, respectively.

In HPSK modulator 209 according to Embodiment 2, ROM is used in coefficient determination section 51, but since outputs from coefficient determination section 51 comprise those resulting from multiplying original filter coefficient An by gain factor βd1 or gain factor βc, and those resulting from performing complex arithmetic on scrambling code Sn, as stated above, coefficient determination section 51 may also be configured using a combination of multipliers, complex multipliers, and ROM. Apart from coefficient determination section 51, the configuration is basically the same as that of HPSK modulator 209 according to Embodiment 1, and therefore a description thereof is omitted here.

As described above, according to Embodiment 2, multiplication by spreading codes Cd1 and Cc is performed for each transmit data 1 and control data 7 of two communication channels, and when the multiplication results are band-limited, filter coefficients Ad1in' and Ad1qn', and Acin' and Acqn', that take gain factors βd1 and βc and scrambling code Sn into consideration are used, thus enabling complex arithmetic section 101 that performs complex arithmetic on data multiplied by spreading codes Cd1 and Cc and scrambling code Sn to be eliminated, allowing the circuit scale to be reduced, and also enabling power consumption to be reduced in line with this reduction in circuit scale.

Embodiment 3

Embodiment 3 of the present invention is a single-mode embodiment, as with HPSK modulator 209 according to Embodiment 1, and will be described as an example in which the configuration of HPSK modulator 209 according to Embodiment 1 is simplified.

Figure 6:
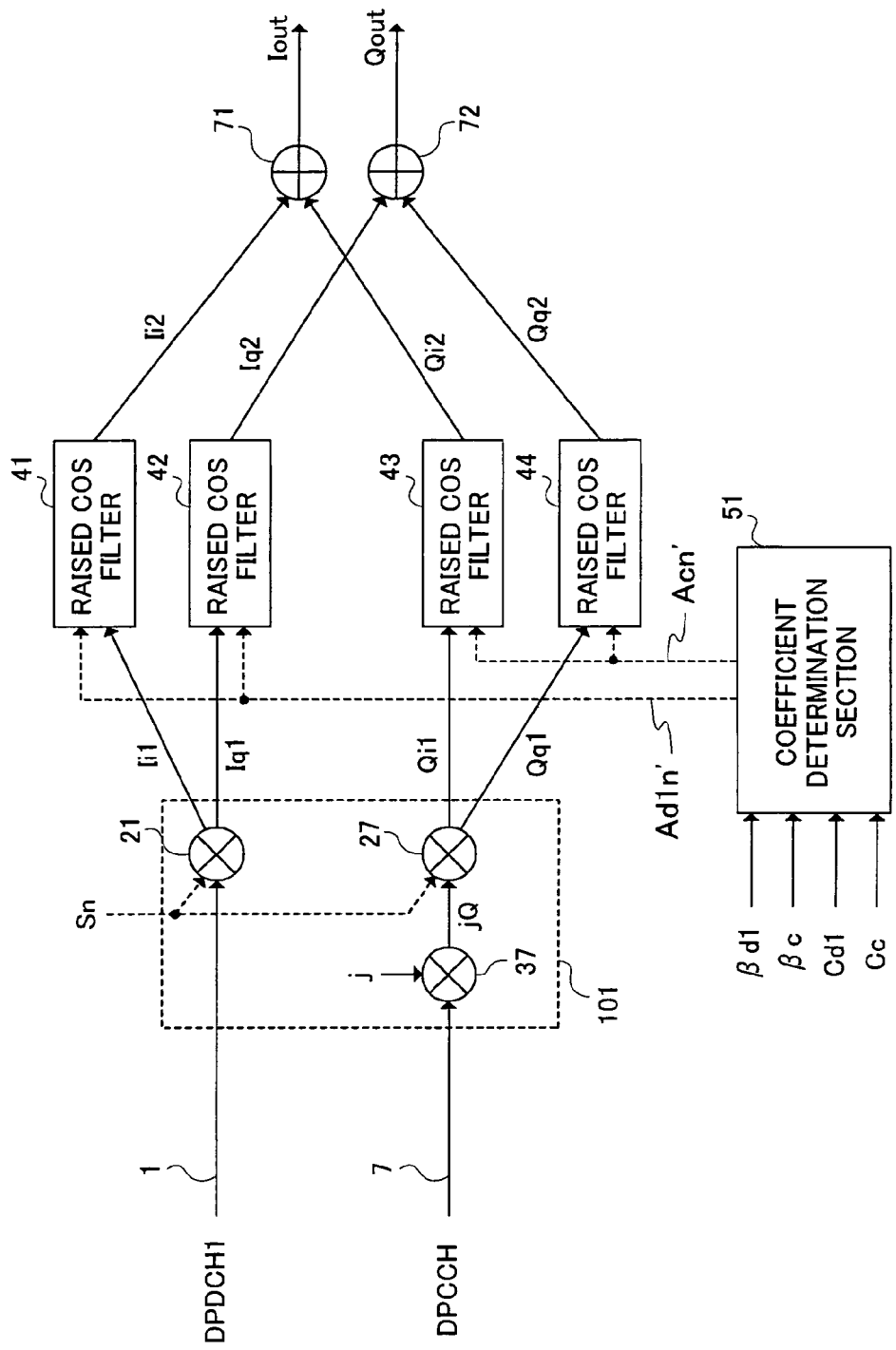
FIG. 6 is a block diagram showing the configuration of an HPSK modulator according to Embodiment 3 of the present invention.

As shown in FIG. 6, HPSK modulator 209 according to Embodiment 3 lacks multiplier 11 and multiplier 17 of HPSK modulator 209 according to Embodiment 1, and is equipped with a coefficient determination section 51 that has a multiplication function for transmit data 1 and spreading code Cd1, and a multiplication function for control data 7 and spreading code Cc. As spreading codes Cd1 and Cc decide the positive/negative sign of data, HPSK modulator 209 according to Embodiment 3 can obtain the same kind of output as HPSK modulator 209 according to Embodiment 1 by varying the positive/negative sign of filter coefficients Ad1n' and Acn' of raised COS filters 41 through 44 according to spreading codes Cd1 and Cc.

Coefficient determination section 51 comprises ROM in the same way as coefficient determination section 51 according to Embodiment 1. Filter coefficients Ad1n' and Acn' output to raised COS filters 41 through 44 comprise those resulting from multiplying original filter coefficient An by gain factors βd1 and βc, and those resulting from multiplication by spreading codes Cd1 and Cc. Therefore, by preparing these computational values in advance and storing them in ROM, it is possible to output filter coefficients Ad1n' and Acn' corresponding to gain factors βd1 and βc, and spreading codes Cd1 and Cc, respectively.

In Embodiment 3, ROM is used in coefficient determination section 51, but since coefficient determination section 51 outputs (filter coefficients) comprise those resulting from multiplying original filter coefficient An by gain factors βd1 and βc, and those resulting from multiplication by spreading codes Cd1 and Cc, as stated above, coefficient determination section 51 may also be configured using a combination of multipliers and ROM.

As described above, according to Embodiment 3, complex arithmetic is performed on transmit data 1 and control data 7 of two communication channels and a scrambling code Sn, and when the computation results are band-limited, filter coefficients Ad1n' and Acn' that take gain factors βd1 and βc and spreading codes Cd1 and Cc into consideration are used, thus enabling the multiplier that multiplies spreading code Cd1 by transmit data 1, and the multiplier that multiplies spreading code Cc by control data 7, to be eliminated. Therefore, in HPSK modulator 209, the circuit scale can be reduced, and power consumption can also be reduced in line with this reduction in circuit scale.

Embodiment 4

Embodiment 4 of the present invention is a single-mode embodiment, as with HPSK modulator 209 according to Embodiment 1, and will be described as an example in which the configuration of HPSK modulator 209 according to Embodiment 1 is simplified.

Figure 7:
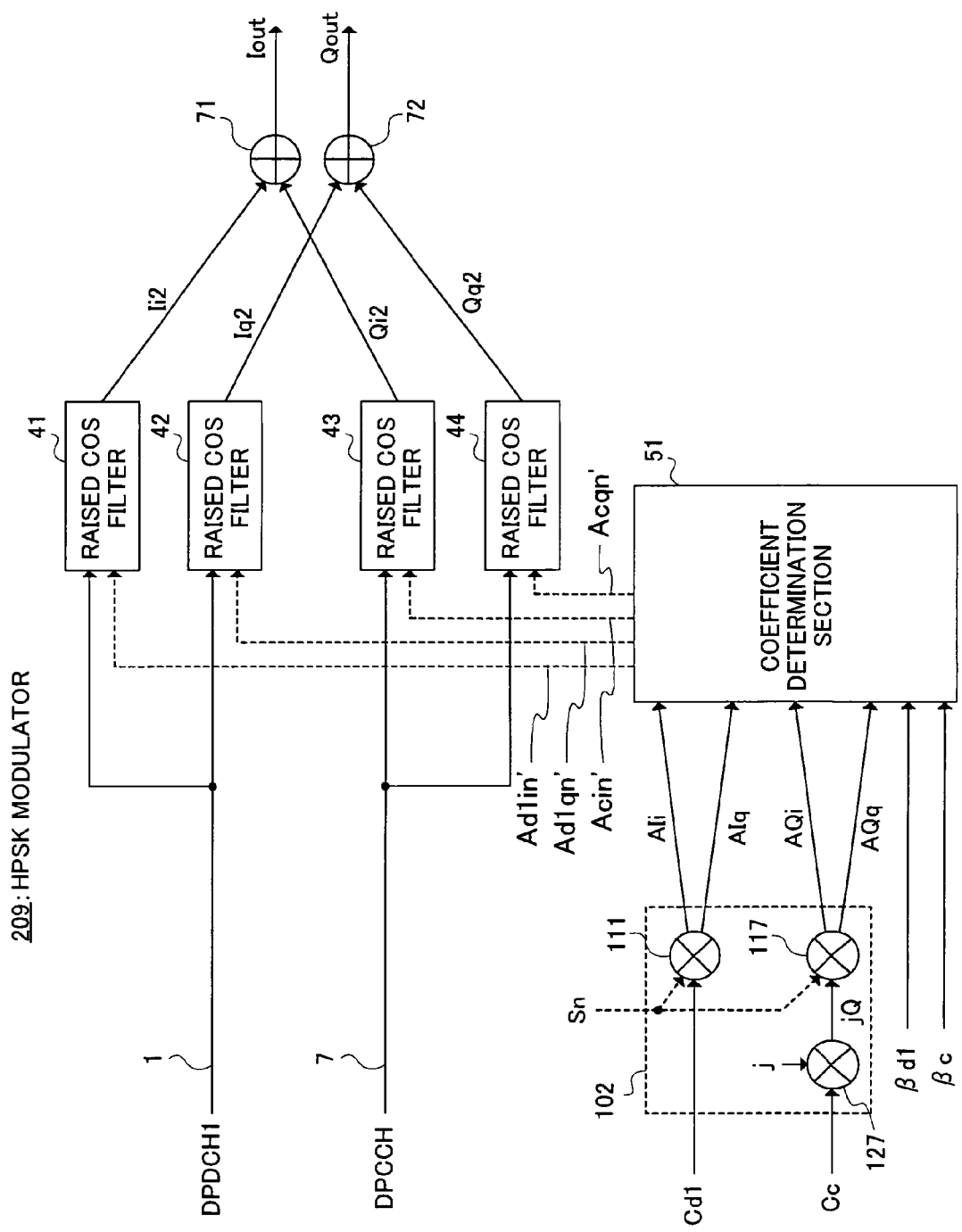
FIG. 7 is a block diagram showing the configuration of an HPSK modulator according to Embodiment 4 of the present invention.

As shown in FIG. 7, HPSK modulator 209 according to Embodiment 4 lacks multiplier 11 and multiplier 17 of HPSK modulator 209 according to Embodiment 1, and also lacks complex arithmetic section 101 that performs complex arithmetic on scrambling code Sn, but is newly equipped with a complex arithmetic section 102 that performs complex arithmetic on spreading codes Cd1 and Cc and scrambling code Sn, and determines filter coefficients Ad1in', Ad1qn', Acin', and Acqn' of raised COS filters 41 through 44 by means of coefficient determination section 51 based on the computational results of complex arithmetic section 102 and gain factors βd1 and βc.

Coefficient determination section 51 comprises ROM in the same way as coefficient determination section 51 according to Embodiment 1. The results of complex arithmetic on spreading codes Cd1 and Cc and scrambling code Sn are complex arithmetic section 102 outputs AIi, AIq, AQi, and AQq, and the products of these outputs AIi, AIq, AQi, and AQq, and spreading codes βd1 and βc, are filter coefficients Ad1$in'$, Ad1$qn'$, Acin', and Acqn' output from coefficient determination section 51. Therefore, by preparing these computational values in advance and storing them in ROM, it is possible to output filter coefficients Ad1$in'$, Ad1$qn'$, Acin', and Acqn' corresponding to complex arithmetic section 102 outputs AIi, AIq, AQi, and AQq, and spreading codes βd1 and βc.

In Embodiment 4, coefficient determination section 51 is implemented using ROM, but since filter coefficients Ad1$in'$, Ad1$qn'$, Acin', and Acqn' output from coefficient determination section 51 are the products of complex arithmetic section 102 outputs AIi, AIq, AQi, and AQq, and spreading codes βd1 and βc, coefficient determination section 51 may also be configured using multipliers.

As described above, according to Embodiment 4, when transmit data 1 and control data 7 of two communication channels are band-limited, filter coefficients Ad1$in'$ Ad1$qn'$, Acin', and Acqn' that take gain factors βd1 and βc, spreading codes Cd1 and Cc, and scrambling code Sn into consideration are used, so that, although a complex arithmetic section 102 is added that performs complex arithmetic on spreading codes Cd1 and Cc and scrambling code Sn, it is possible to eliminate multiplier 11 that multiplies transmit data 1 by spreading code Cd1, multiplier 17 that multiplies control data 7 by spreading code Cc, and complex arithmetic section 101 that performs complex arithmetic on data multiplied by spreading codes Cd1 and Cc, and scrambling code Sn. Therefore, in HPSK modulator 209, the circuit scale can be reduced, and power consumption can also be reduced in line with this reduction in circuit scale.

Embodiment 5

Figure 8:
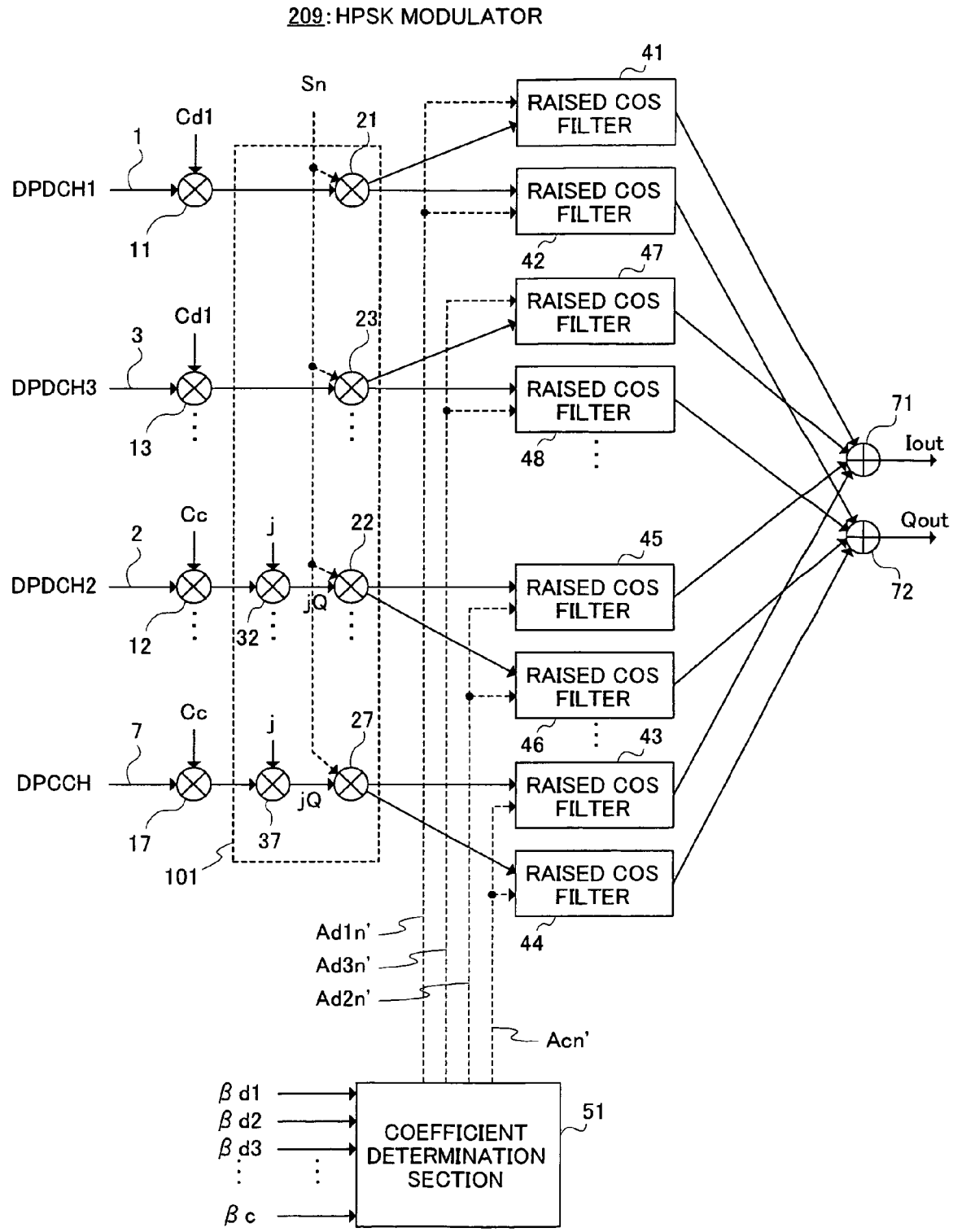
FIG. 8 is a block diagram showing the configuration of an HPSK modulator according to Embodiment 5 of the present invention.

In Embodiment 5 an example will be described in which HPSK modulator 209 according to Embodiment 1 shown in FIG. 1 is applied to multimode operation. As shown in FIG. 8, HPSK modulator 209 according to Embodiment 5 is equipped with dedicated physical data channels DPDCH2, DPDCH3, ... in addition to dedicated physical data channel DPDCH1. To make it easier to understand the configuration of HPSK modulator 209, FIG. 8 shows only the actual configuration for dedicated physical data channels DPDCH1 through DPDCH3, and only this configuration is described here. The actual configuration of other dedicated physical data channels DPDCH4 onward, and a description thereof, are omitted here.

In HPSK modulator 209, due to the addition of even-numbered dedicated physical data channel DPDCH2 (and DPDCH4, DPDCH6, ... ), a multiplier 12, multiplier 32, multiplier 22, raised COS filter 45, and raised COS filter 46 are provided for this dedicated physical data channel DPDCH2. Filter coefficient Ad2$n'$ is output to raised COS filters 45 and 46 from coefficient determination section 51. Also, due to the addition of odd-numbered dedicated physical data channel DPDCH3 (and DPDCH5, DPDCH7, a multiplier 13, multiplier 23, raised COS filter 47, and raised COS filter 48 are provided for this dedicated physical data channel DPDCH3. Filter coefficient Ad3$n'$ is output to raised COS filters 47 and 48 from coefficient determination section 51.

The remainder of the configuration of HPSK modulator 209 is the same as the configuration of previously described HPSK modulator 209 according to Embodiment 1 shown in FIG. 1, and therefore a description thereof is omitted here.

Also, the operations of each part of odd-numbered dedicated physical data channels DPDCH3, DPDCH5, ... added to HPSK modulator 209 in line with multimode operation are basically the same as the operations of multiplier 11, multiplier 21, raised COS filter 41, raised COS filter 42, and coefficient determination section 51 of dedicated physical data channel DPDCH1 shown in FIG. 1, and therefore a description thereof is omitted here. Similarly, the operations of each part of even-numbered dedicated physical data channels DPDCH2, DPDCH4, ... added to HPSK modulator 209 in line with multimode operation are basically the same as the operations of the respective parts of dedicated physical control channel DPCCH, despite the differences between transmit data 2, 4, ... and control data 7, and therefore a description thereof is omitted here. Adder 71 adds together real part data of each channel output from raised COS filters 41, 47, 45, and 43, and outputs added data Iout. Adder 72 adds together imaginary part data of each channel output from raised COS filters 42, 48, 46, and 44, and outputs added data Qout.

As described above, according to Embodiment 5, the same kind of effect can be obtained in multimode operation as the effect obtained by previously described HPSK modulator 209 according to Embodiment 1 shown in FIG. 1. Furthermore, according to Embodiment 5, data processing can be performed for each communication channel, and full-power-down implementation can be executed in data processing of an unused channel. Therefore, the power consumption of HPSK modulator 209 can be reduced when single mode is used frequently.

Embodiment 6

Figure 9:
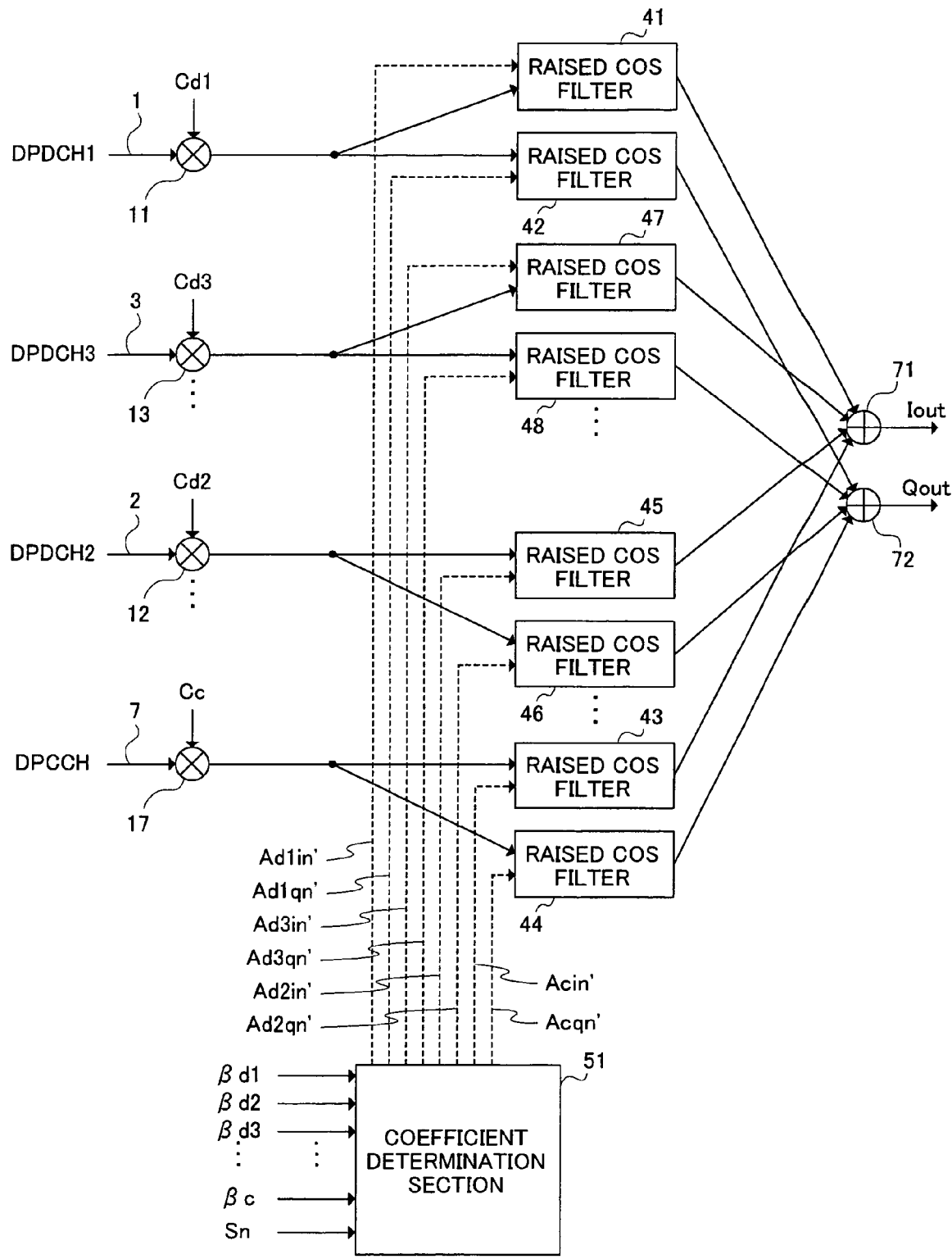
FIG. 9 is a block diagram showing the configuration of an HPSK modulator according to Embodiment 6 of the present invention.

In Embodiment 6 an example will be described in which HPSK modulator 209 according to Embodiment 2 shown in FIG. 5 is applied to multimode operation. As shown in FIG. 9, HPSK modulator 209 according to Embodiment 6 is equipped with dedicated physical data channels DPDCH2, DPDCH3, ... in addition to dedicated physical data channel DPDCH1.

In HPSK modulator 209, due to the addition of even-numbered dedicated physical data channel DPDCH2 (and DPDCH4, DPDCH6, ... ), a multiplier 12, raised COS filter 45, and raised COS filter 46 are provided for this dedicated physical data channel DPDCH2. Filter coefficient Ad2$in'$ is output to raised COS filter 45 from coefficient determination section 51, and filter coefficient Ad2$qn'$ is output to raised COS filter 46 from coefficient determination section 51. Also, due to the addition of odd-numbered dedicated physical data channel DPDCH3 (and DPDCH5, DPDCH7, ... ), a multiplier 13, raised COS filter 47, and raised COS filter 48 are provided for this dedicated physical data channel DPDCH3. Filter coefficient Ad3 in' is output to raised COS filter 47 from coefficient determination section 51, and filter coefficient Ad3$qn'$ is output to raised COS filter 48 from coefficient determination section 51.

The remainder of the configuration of HPSK modulator 209 is the same as the configuration of previously described HPSK modulator 209 according to Embodiment 2 shown in FIG. 5, and therefore a description thereof is omitted here. Also, the operations of each part of odd-numbered dedicated physical data channels DPDCH3, DPDCH5, ... added to HPSK modulator 209 in line with multimode operation are basically the same as the operations of multiplier 11, raised COS filter 41, raised COS filter 42, and coefficient determination section 51 of dedicated physical data channel DPDCH1 shown in FIG. 5, and therefore a description thereof is omitted here. Similarly, the operations of each part of even-numbered dedicated physical data channels DPDCH2, DPDCH4, . . . added to HPSK modulator 209 in line with multimode operation are basically the same as the operations of the respective parts of dedicated physical control channel DPCCH, despite the differences between transmit data 2, 4, . . . and control data 7, and therefore a description thereof is omitted here. Adder 71 adds together real part data of each channel output from raised COS filters 41, 47, 45, and 43, and outputs added data Iout. Adder 72 adds together imaginary part data of each channel output from raised COS filters 42, 48, 46, and 44, and outputs added data Qout.

As described above, according to Embodiment 6, the same kind of effect can be obtained in multimode operation as the effect obtained by previously described HPSK modulator 209 according to Embodiment 2 shown in FIG. 5. Furthermore, according to Embodiment 6, data processing can be performed for each communication channel, and full-power-down implementation can be executed in data processing of an unused channel. Therefore, the power consumption of HPSK modulator 209 can be reduced when single mode is used frequently.

Embodiment 7

Figure 10:
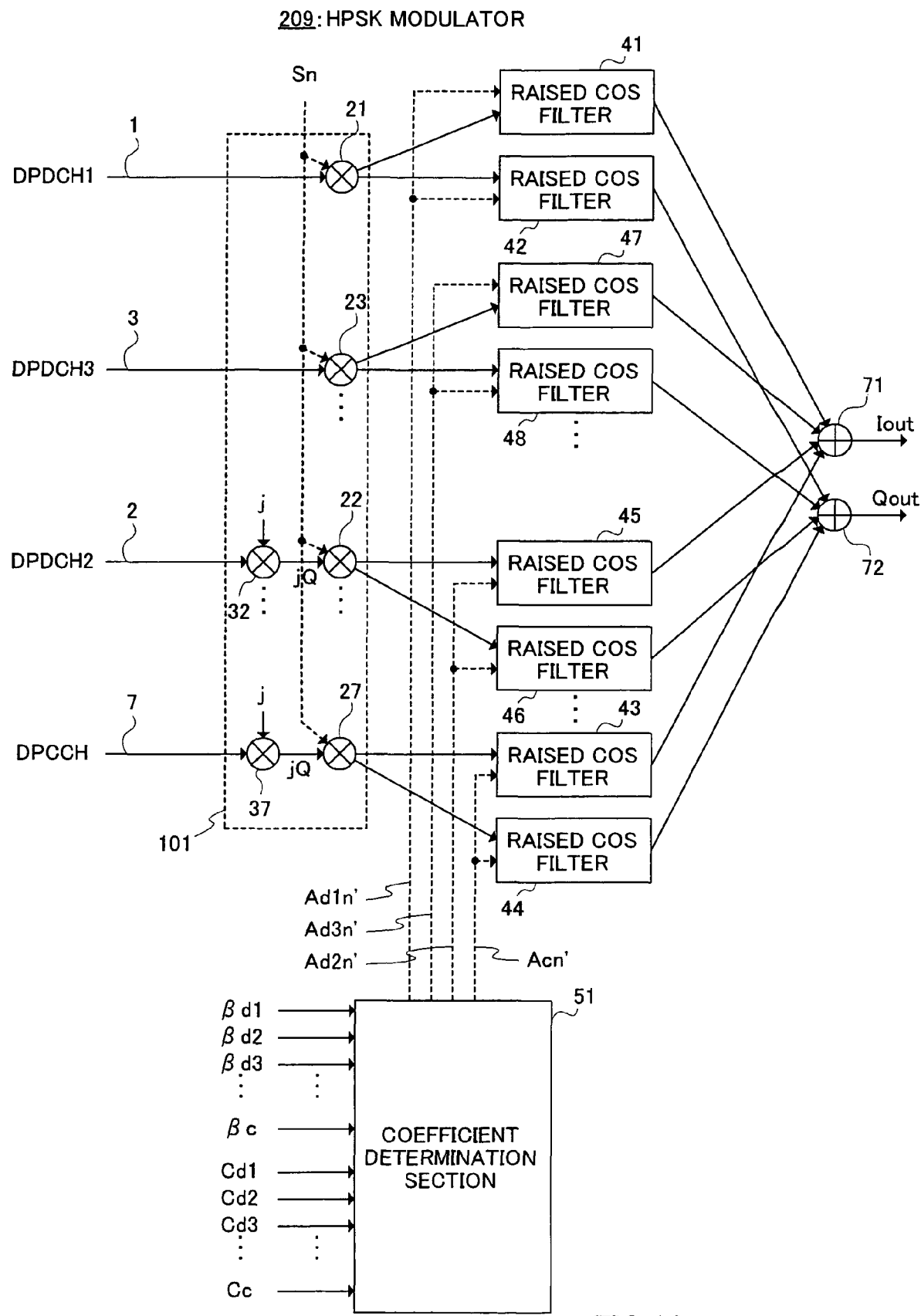
FIG. 10 is a block diagram showing the configuration of an HPSK modulator according to Embodiment 7 of the present invention.

In Embodiment 7 an example will be described in which HPSK modulator 209 according to Embodiment 3 shown in FIG. 6 is applied to multimode operation. As shown in FIG. 10, HPSK modulator 209 according to Embodiment 7 is equipped with dedicated physical data channels DPDCH2, DPDCH3, . . . in addition to dedicated physical data channel DPDCH1.

In HPSK modulator 209, due to the addition of even-numbered dedicated physical data channel DPDCH2 (and DPDCH4, DPDCH6, . . . ), a multiplier 32, multiplier 22, raised COS filter 45, and raised COS filter 46 are provided for this dedicated physical data channel DPDCH2. Filter coefficient Ad2$n'$ is output to raised COS filters 45 and 46 from coefficient determination section 51. Also, due to the addition of odd-numbered dedicated physical data channel DPDCH3 (and DPDCH5, DPDCH7, . . . ), a multiplier 23, raised COS filter 47, and raised COS filter 48 are provided for this dedicated physical data channel DPDCH3. Filter coefficient Ad3$n'$ is output to raised COS filters 47 and 48 from coefficient determination section 51.

The remainder of the configuration of HPSK modulator 209 is the same as the configuration of previously described HPSK modulator 209 according to Embodiment 3 shown in FIG. 6, and therefore a description thereof is omitted here. Also, the operations of each part of odd-numbered dedicated physical data channels DPDCH3, DPDCH5, . . . added to HPSK modulator 209 in line with multimode operation are basically the same as the operations of multiplier 11, raised COS filter 41, raised COS filter 42, and coefficient determination section 51 of dedicated physical data channel DPDCH1 shown in FIG. 6, and therefore a description thereof is omitted here. Similarly, the operations of each part of even-numbered dedicated physical data channels DPDCH2, DPDCH4, . . . added to HPSK modulator 209 in line with multimode operation are basically the same as the operations of the respective parts of dedicated physical control channel DPCCH, despite the differences between transmit data 2, 4, . . . and control data 7, and therefore a description thereof is omitted here. Adder 71 adds together real part data of each channel output from raised COS filters 41, 47, 45, and 43, and outputs added data Iout. Adder 72 adds together imaginary part data of each channel output from raised COS filters 42, 48, 46, and 44, and outputs added data Qout.

As described above, according to Embodiment 7, the same kind of effect can be obtained in multimode operation as the effect obtained by previously described HPSK modulator 209 according to Embodiment 3 shown in FIG. 6. Furthermore, according to Embodiment 7, data processing can be performed for each communication channel, and full-power-down implementation can be executed in data processing of an unused channel. Therefore, the power consumption of HPSK modulator 209 can be reduced when single mode is used frequently.

Embodiment 8

Figure 11:
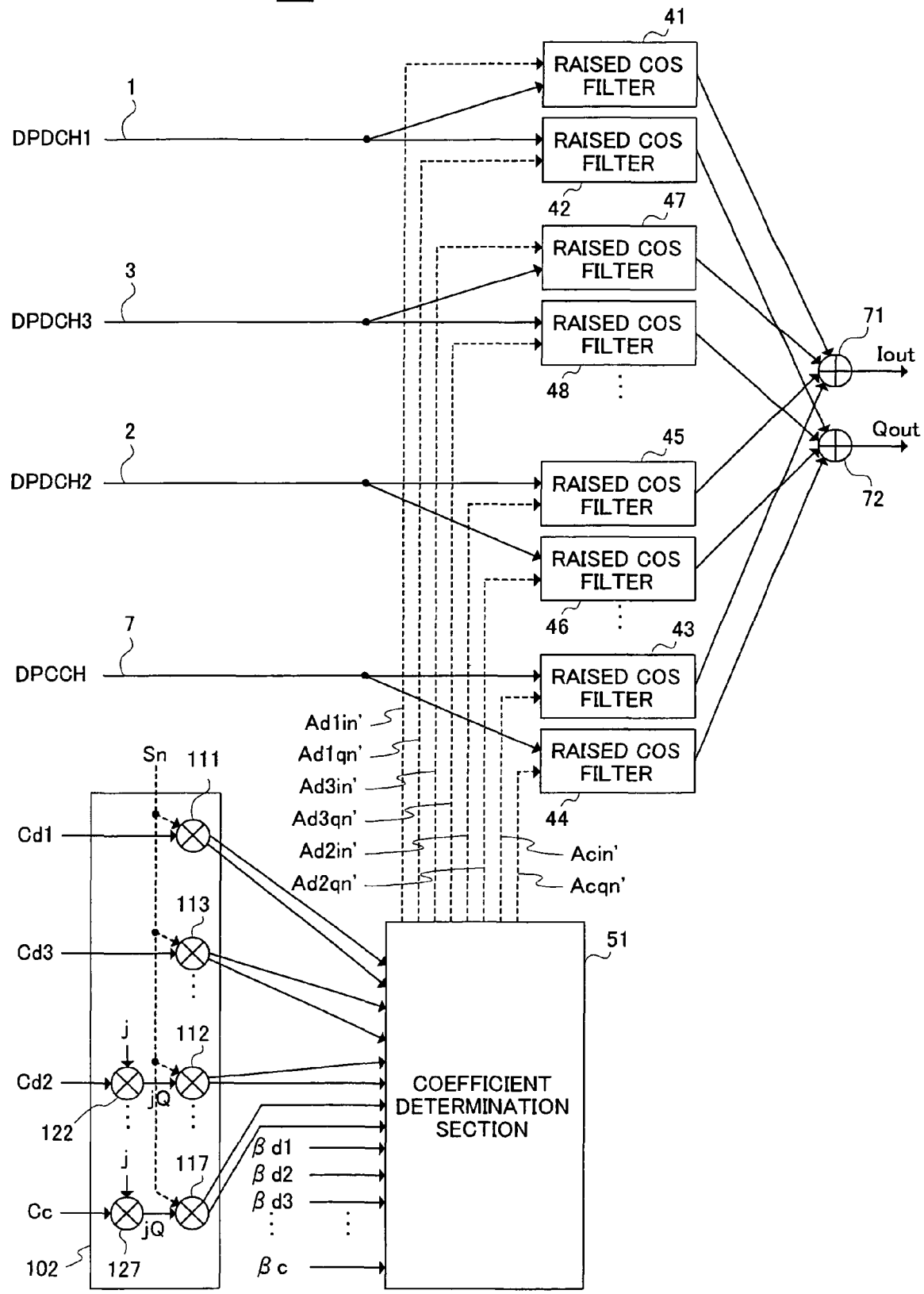
FIG. 11 is a block diagram showing the configuration of an HPSK modulator according to Embodiment 8 of the present invention.
Figure 12:
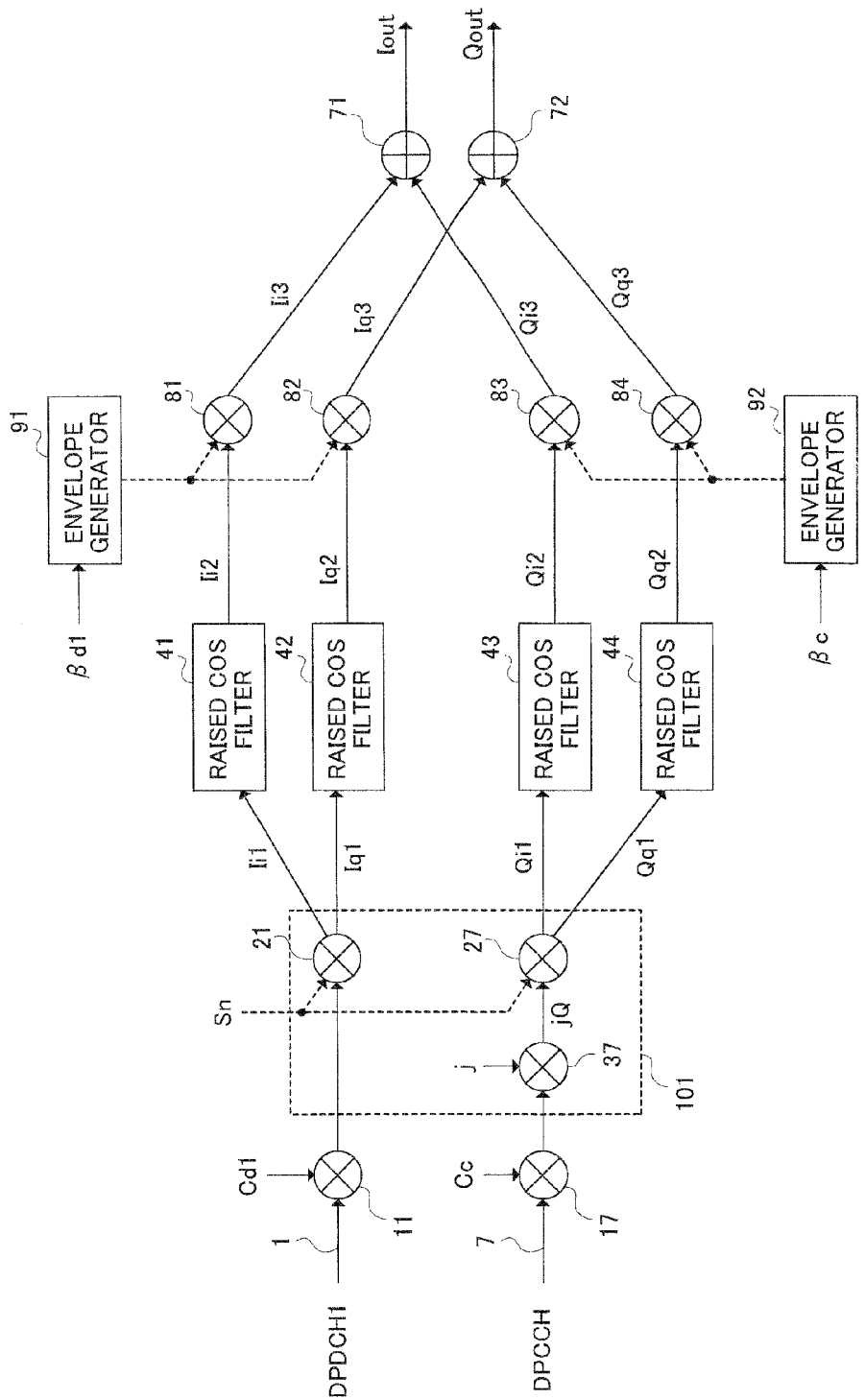
FIG. 12 is a block diagram in the case of single mode of an HPSK modulator according to conventional technology prior to the present invention.

In Embodiment 8 an example will be described in which HPSK modulator 209 according to Embodiment 4 shown in FIG. 7 is applied to multimode operation. As shown in FIG. 11, HPSK modulator 209 according to Embodiment 8 is equipped with dedicated physical data channels DPDCH2, DPDCH3, . . . in addition to dedicated physical data channel DPDCH1.

In HPSK modulator 209, due to the addition of even-numbered dedicated physical data channel DPDCH2 (and DPDCH4, DPDCH6, . . . ), a raised COS filter 45 and raised COS filter 46 are provided for this dedicated physical data channel DPDCH2. Filter coefficient Ad2$in'$ is output to raised COS filter 45 from coefficient determination section 51, and filter coefficient Ad2$qn'$ is output to raised COS filter 46 from coefficient determination section 51. Also, due to the addition of odd-numbered dedicated physical data channel DPDCH3 (and DPDCH5, DPDCH7, . . . ), a raised COS filter 47 and raised COS filter 48 are provided for this dedicated physical data channel DPDCH3. Filter coefficient Ad3$in'$ is output to raised COS filter 47 from coefficient determination section 51, and filter coefficient Ad3$qn'$ is output to raised COS filter 48 from coefficient determination section 51.

The remainder of the configuration of HPSK modulator 209 is the same as the configuration of previously described HPSK modulator 209 according to Embodiment 4 shown in FIG. 7, and therefore a description thereof is omitted here. Also, the operations of each part of odd-numbered dedicated physical data channels DPDCH3, DPDCH5, . . . added to HPSK modulator 209 in line with multimode operation are basically the same as the operations of raised COS filter 41, raised COS filter 42, and coefficient determination section 51 of dedicated physical data channel DPDCH1 shown in FIG. 7, and therefore a description thereof is omitted here. Similarly, the operations of each part of even-numbered dedicated physical data channels DPDCH2, DPDCH4, . . . added to HPSK modulator 209 in line with multimode operation are basically the same as the operations of the respective parts of dedicated physical control channel DPCCH, despite the differences between transmit data 2, 4, . . . and control data 7, and therefore a description thereof is omitted here. Adder 71 adds together real part data of each channel output from raised COS filters 41, 47, 45, and 43, and outputs added data Iout. Adder 72 adds together imaginary part data of each channel output from raised COS filters 42, 48, 46, and 44, and outputs added data Qout.

As described above, according to Embodiment 8, the same kind of effect can be obtained in multimode operation as the effect obtained by previously described HPSK modulator 209 according to Embodiment 4 shown in FIG. 7. Furthermore, according to Embodiment 8, data processing can be performed for each communication channel, and full-power-down implementation can be executed in data processing of an unused channel. Therefore, the power consumption of HPSK modulator 209 can be reduced when single mode is used frequently.

Thus, according to the present invention, a modulator, and more particularly an HPSK modulator, can be provided that enables circuit scale to be reduced, and also enables power consumption to be reduced.

That is to say, a modulator according to a first characteristic of an embodiment of the present invention has a configuration equipped with a spreading code multiplication section that multiplies transmit data by a spreading code; a complex arithmetic section that performs complex arithmetic on an output signal output from the spreading code multiplication section and a scrambling code, and converts the output signal to complex data; a coefficient determination section that determines a filter coefficient based on a gain factor that determines transmission power; and a filter that band-limits the complex data using the filter coefficient.

A modulator according to a second characteristic of an embodiment of the present invention has a configuration equipped with a spreading code multiplication section that multiplies transmit data by a spreading code; a filter that band-limits an output signal output from the spreading code multiplication section; and a coefficient determination section that determines a filter coefficient of the filter based on a gain factor that determines transmission power and a scrambling code.

A modulator according to a third characteristic of an embodiment of the present invention has a configuration equipped with a complex arithmetic section that performs complex arithmetic on transmit data and a scrambling code, and converts the transmit data to complex data; a filter that band-limits complex data output from the complex arithmetic section; and a coefficient determination section that determines a filter coefficient of the filter based on a gain factor that determines transmission power and a spreading code.

A modulator according to a fourth characteristic of an embodiment of the present invention has a configuration equipped with a filter that band-limits transmit data; a complex arithmetic section that performs complex arithmetic on a spreading code and a scrambling code; and a coefficient determination section that determines a filter coefficient of the filter based on complex data output from the complex arithmetic section and a gain factor that determines transmission power.

A modulator according to a fifth characteristic of an embodiment of the present invention has a configuration in which the transmit data, spreading code, and scrambling code are each 1-bit data.

A modulator according to a sixth characteristic of an embodiment of the present invention has a configuration in which the spreading code multiplication section is configured by means of an exclusive-OR circuit.

A modulator according to a seventh characteristic of an embodiment of the present invention has a configuration in which the complex arithmetic section is configured by means of an exclusive-OR circuit.

A modulator according to an eighth characteristic of an embodiment of the present invention has a configuration in which the filter is configured by means of a 1-bit-input FIR filter.

A modulator according to a ninth characteristic of an embodiment of the present invention has a configuration in which the filter coefficient of the filter is selected by means of any one or a plurality of the transmit data, the spreading code, the scrambling code, and/or the gain factor.

According to a modulator according to the first through ninth characteristics, an input signal is multiplied by a spreading code followed by complex arithmetic involving a scrambling code and conversion to complex data, a filter coefficient is calculated from a gain factor, and complex data is band-limited by a filter using the filter coefficient, thus enabling a multiplier that multiplies a gain factor by band-limited complex data to be eliminated. As a result, the circuit scale can be reduced, and power consumption can also be reduced in line with this reduction in circuit scale.

An HPSK modulator according to a tenth characteristic of an embodiment of the present invention has a configuration equipped with a spreading code multiplication section that has control channel control data and transmit channel transmit data as input, multiplies the control data and transmit data by a spreading code, and outputs the resulting data; a complex arithmetic section that performs complex arithmetic on each output from the spreading code multiplication section and a scrambling code, and performs expansion into real part data and imaginary part data for each control channel and each transmit channel; a coefficient determination section that outputs a filter coefficient based on a gain factor; a raised COS filter that band-limits output signals output from the complex arithmetic section for each control channel and for each transmit channel using the filter coefficient; and an adding section that adds real part data of each control channel and of each transmit channel that passes through the raised COS filter, and also adds respective imaginary part data thereof.

According to an HPSK modulator according to the tenth characteristic, control data and transmit data are multiplied by a spreading code followed by complex arithmetic involving a scrambling code and expansion to real part data and imaginary part data for each channel, band-limiting is performed by a raised COS filter using a filter coefficient determined by a gain factor, and furthermore real part data of each channel are added and imaginary part data of each channel are added, thus enabling a multiplier that multiplies a gain factor by band-limited complex data to be eliminated. As a result, the circuit scale can be reduced, and power consumption can also be reduced in line with this reduction in circuit scale.

An HPSK modulator according to an eleventh characteristic of an embodiment of the present invention has a configuration equipped with a spreading code multiplication section that has control channel control data and transmit channel transmit data as input, and multiplies the control data and transmit data by a spreading code; a raised COS filter that band-limits an output signal output from the spreading code multiplication section; a coefficient determination section that determines a filter coefficient of the raised COS filter based on a gain factor that determines transmission power and a scrambling code; and an adding section that adds real part data of each control channel and of each transmit channel that passes through the raised COS filter, and also adds respective imaginary part data thereof.

According to an HPSK modulator according to the eleventh characteristic, control data and transmit data are multiplied by a spreading code followed by band-limiting by a raised COS filter using a filter coefficient determined by a gain factor and scrambling code, and then real part data of each channel are added and imaginary part data of each channel are added, thus enabling the number of multipliers that multiply a gain factor by band-limited complex data to be reduced. As a result, the circuit scale can be reduced, and power consumption can also be reduced in line with this reduction in circuit scale.

An HPSK modulator according to a twelfth characteristic of an embodiment of the present invention has a configuration equipped with a complex arithmetic section that has control channel control data and transmit channel transmit data as input, performs complex arithmetic on the control data and the transmit data and a scrambling code, and performs expansion into real part data and imaginary part data for each control channel and each transmit channel; a raised COS filter that band-limits complex data output from the complex arithmetic section; a spreading multiplication section that multiplies the control data and transmit data by a gain factor; a coefficient determination section that determines a filter coefficient of the raised COS filter based on a spreading code and the gain factor; and an adding section that adds real part data of each control channel and of each transmit channel that passes through the raised COS filter, and also adds respective imaginary part data thereof.

According to an HPSK modulator according to the twelfth characteristic, control data and transmit data undergo complex arithmetic with a scrambling code and are expanded into real part data and imaginary part data of each channel, followed by band-limiting by a raised COS filter using a filter coefficient determined by a gain factor and spreading code, and furthermore real part data of each channel are added and imaginary part data of each channel are added, thus enabling the number of multipliers that multiply a gain factor by band-limited complex data to be reduced. As a result, the circuit scale can be reduced, and power consumption can also be reduced in line with this reduction in circuit scale.

An HPSK modulator according to a thirteenth characteristic of an embodiment of the present invention has a configuration equipped with a raised COS filter that has control channel control data and transmit channel transmit data as input, and band-limits the control data and transmit data; a complex arithmetic section that performs complex arithmetic based on a spreading code and scrambling code; a coefficient determination section that determines a filter coefficient of the raised COS filter based on complex data output from the complex arithmetic section and a gain factor; and an adding section that adds real part data of each control channel and of each transmit channel that passes through the raised COS filter, and also adds respective imaginary part data thereof.

According to an HPSK modulator according to the thirteenth characteristic, complex arithmetic is performed with a spreading code and scrambling code, a filter coefficient of a raised COS filter is determined based on the complex arithmetic result and a gain factor, control data and transmit data are band-limited by the raised COS filter, and then real part data of each channel are added and imaginary part data of each channel are added, thus enabling the number of multipliers that multiply a gain factor by band-limited complex data to be reduced. As a result, the circuit scale can be reduced, and power consumption can also be reduced in line with this reduction in circuit scale.

Therefore, a modulator according to the present invention has an effect of enabling the circuit scale to be reduced and also enabling power consumption to be reduced, and is widely effective as a digital modulator incorporated in a W-CDMA or other radio communication apparatus or the like.

The present invention is not limited to the above-described embodiments, and various variations and modifications may be possible without departing from the scope of the present invention.

This application is based on Japanese Patent Application No. 2004-198072 filed on Jul. 5, 2004, the entire content of which is expressly incorporated by reference herein.

What is claimed is:

1. A modulator comprising:
a complex arithmetic section that performs complex arithmetic on a spreading code and a scrambling code so as to output complex data;
a coefficient determination section that multiplies the complex data and a gain factor that determines transmission power, and determines a filter coefficient matching said gain factor; and
a filter that band-limits transmit data using said filter coefficient determined in said coefficient determination section.

2. A modulator comprising:
a spreading code multiplication section that multiplies transmit data by a spreading code so as to produce an output signal;
a complex arithmetic section that performs complex arithmetic on the output signal by multiplying the output signal by a single scrambling code so as to convert the output signal to complex data;
a coefficient determination section that multiplies a filter coefficient for band-limiting said complex data by a gain factor that determines transmission power and determines a filter coefficient matching said gain factor; and
a filter that band-limits said complex data using said filler coefficient determined in said coefficient determination section,
wherein said filter coefficient of said filter is changed dynamically based on said scrambling code, and said gain factor.

3. A hybrid phase shift keying modulator comprising:
a complex arithmetic section that performs complex arithmetic on a spreading code and a scrambling code so as to output complex data;
a coefficient determination section that multiplies the complex data and a gain factor that determines transmission power, and determines a filter coefficient matching said gain factor;
a raised COS filter that band-limits control data on a control channel and transmit data on a transmit channel using said filter coefficient determined in said coefficient determination section; and
an adding section that adds real part data of each said control channel and of each said transmit channel that passes through said raised COS filter, and also adds respective imaginary part data thereof.

* * * * *